(12) United States Patent
Kim et al.

(10) Patent No.: US 8,958,382 B2
(45) Date of Patent: Feb. 17, 2015

(54) METHOD AND DEVICE FOR RECEIVING DOWNLINK SIGNALS

(75) Inventors: Hakseong Kim, Anyang-si (KR); Hanbyul Seo, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 13/696,753

(22) PCT Filed: May 11, 2011

(86) PCT No.: PCT/KR2011/003452
§ 371 (c)(1),
(2), (4) Date: Nov. 7, 2012

(87) PCT Pub. No.: WO2011/142574
PCT Pub. Date: Nov. 17, 2011

(65) Prior Publication Data
US 2013/0058304 A1    Mar. 7, 2013

Related U.S. Application Data

(60) Provisional application No. 61/333,539, filed on May 11, 2010.

(51) Int. Cl.
*H04L 1/00* (2006.01)
*H04L 5/00* (2006.01)
*H04W 72/12* (2009.01)

(52) U.S. Cl.
CPC .............. *H04L 5/0053* (2013.01); *H04L 5/001* (2013.01); *H04L 5/0094* (2013.01); *H04W 72/1289* (2013.01); *H04L 5/0039* (2013.01)
USPC ....................................................... 370/329

(58) Field of Classification Search
None
See application file for complete search history.

(56) References Cited

U.S. PATENT DOCUMENTS 7,729,377 B2 *   6/2010   Seo et al. ................... 370/468
7,808,949 B2 *  10/2010   Seo et al. ................... 370/329
(Continued)

FOREIGN PATENT DOCUMENTS

EP          1919143 A3 *   4/2011
KR    10-2009-0032929       4/2009
(Continued)

OTHER PUBLICATIONS

Motorola, Inc., "Long Term Evolution (LTE): Overview of LTE Air-Interface Technical White Paper", 2007.*
(Continued)

*Primary Examiner* — Ayaz Sheikh
*Assistant Examiner* — Faiyazkhan Ghafoerkhan
(74) *Attorney, Agent, or Firm* — McKenna Long & Aldridge LLP

(57) ABSTRACT

The present invention relates to a method and device for receiving downlink signals in a wireless communication system. In more detail, the method for receiving downlink signals includes: receiving first control information for downlink scheduling through a first slot in a pair of resource blocks (RBs), the first control information including allocation information on a plurality of continuous RBs; receiving data from a second slot in a pair of RBs if the pair of RBs includes the first control information in the plurality of continuous RBs; and, if the pair of RBs outside the plurality of continuous RBs includes the first control information, attempting to detect second control information on uplink scheduling through a second slot of a pair of RBs.

8 Claims, 13 Drawing Sheets

(56) References Cited

U.S. PATENT DOCUMENTS

| | | | |
|---|---|---|---|
| 7,885,230 B2* | 2/2011 | Seo et al. | 370/329 |
| 8,018,966 B2* | 9/2011 | Seo et al. | 370/468 |
| 8,245,092 B2* | 8/2012 | Kotecha et al. | 714/748 |
| 8,300,582 B2* | 10/2012 | Malladi et al. | 370/329 |
| 8,305,988 B2* | 11/2012 | Seo et al. | 370/329 |
| 8,315,225 B2* | 11/2012 | Xu et al. | 370/330 |
| 8,369,302 B2* | 2/2013 | Dai et al. | 370/344 |
| 8,374,143 B2* | 2/2013 | Kim et al. | 370/329 |
| 8,446,849 B2* | 5/2013 | Damnjanovic | 370/311 |
| 8,472,466 B2* | 6/2013 | Seo et al. | 370/442 |
| 8,493,835 B2* | 7/2013 | Gaal et al. | 370/208 |
| 8,498,259 B2* | 7/2013 | Suzuki et al. | 370/329 |
| 8,503,356 B2* | 8/2013 | Zhang et al. | 370/328 |
| 8,630,242 B2* | 1/2014 | Lee et al. | 370/329 |
| 2003/0053575 A1* | 3/2003 | Tomsu et al. | 375/369 |
| 2006/0293008 A1* | 12/2006 | Hiraki et al. | 455/226.4 |
| 2007/0117563 A1* | 5/2007 | Terry et al. | 455/434 |
| 2007/0155390 A1* | 7/2007 | Kodikara Patabandi et al. | 455/450 |
| 2007/0161377 A1* | 7/2007 | Kodikara Patabandi et al. | 455/450 |
| 2007/0189205 A1* | 8/2007 | Terry et al. | 370/328 |
| 2007/0224995 A1* | 9/2007 | Frederiksen et al. | 455/437 |
| 2008/0051084 A1* | 2/2008 | Casati et al. | 455/435.1 |
| 2008/0096563 A1* | 4/2008 | Fischer et al. | 455/436 |
| 2008/0165893 A1* | 7/2008 | Malladi et al. | 375/299 |
| 2008/0232284 A1* | 9/2008 | Dalsgaard et al. | 370/310 |
| 2008/0298497 A1* | 12/2008 | Cho et al. | 375/295 |
| 2009/0003274 A1* | 1/2009 | Kwak et al. | 370/329 |
| 2009/0010219 A1* | 1/2009 | Lee et al. | 370/329 |
| 2009/0016254 A1* | 1/2009 | Lee et al. | 370/312 |
| 2009/0103482 A1* | 4/2009 | Imamura et al. | 370/329 |
| 2009/0109906 A1* | 4/2009 | Love et al. | 370/329 |
| 2009/0175231 A1* | 7/2009 | Seo et al. | 370/329 |
| 2009/0180402 A1* | 7/2009 | Lindoff et al. | 370/277 |
| 2009/0180433 A1* | 7/2009 | Ahn et al. | 370/329 |
| 2009/0181690 A1* | 7/2009 | McCoy et al. | 455/452.1 |
| 2009/0203323 A1* | 8/2009 | Ratasuk et al. | 455/68 |
| 2009/0207797 A1* | 8/2009 | Shen et al. | 370/329 |
| 2009/0232095 A1* | 9/2009 | Ahn et al. | 370/331 |
| 2009/0241004 A1* | 9/2009 | Ahn et al. | 714/749 |
| 2009/0245193 A1* | 10/2009 | Gaal et al. | 370/329 |
| 2009/0290538 A1* | 11/2009 | Kim et al. | 370/328 |
| 2009/0310475 A1* | 12/2009 | Seo et al. | 370/203 |
| 2009/0310476 A1* | 12/2009 | Seo et al. | 370/203 |
| 2009/0316814 A1* | 12/2009 | Seo et al. | 375/260 |
| 2010/0040001 A1* | 2/2010 | Montojo et al. | 370/329 |
| 2010/0040009 A1* | 2/2010 | Gaal et al. | 370/329 |
| 2010/0080139 A1* | 4/2010 | Palanki et al. | 370/252 |
| 2010/0098012 A1* | 4/2010 | Bala et al. | 370/329 |
| 2010/0115358 A1* | 5/2010 | Kotecha et al. | 714/748 |
| 2010/0151874 A1* | 6/2010 | Cai et al. | 455/452.1 |
| 2010/0195566 A1* | 8/2010 | Krishnamurthy et al. | 370/328 |
| 2010/0195612 A1* | 8/2010 | Seo et al. | 370/329 |
| 2010/0246559 A1* | 9/2010 | Ogawa et al. | 370/345 |
| 2010/0260154 A1* | 10/2010 | Frank et al. | 370/336 |
| 2010/0279628 A1* | 11/2010 | Love et al. | 455/70 |
| 2010/0316011 A1* | 12/2010 | Lin | 370/329 |
| 2010/0322179 A1* | 12/2010 | Yu et al. | 370/329 |
| 2010/0322182 A1* | 12/2010 | Seo et al. | 370/329 |
| 2010/0329220 A1* | 12/2010 | Kim et al. | 370/336 |
| 2011/0044270 A1* | 2/2011 | Seo et al. | 370/329 |
| 2011/0085457 A1* | 4/2011 | Chen et al. | 370/252 |
| 2011/0085508 A1* | 4/2011 | Wengerter et al. | 370/329 |
| 2011/0105136 A1* | 5/2011 | Choi | 455/452.1 |
| 2011/0201341 A1* | 8/2011 | Choudhury et al. | 455/450 |
| 2011/0235682 A1* | 9/2011 | He et al. | 375/132 |
| 2011/0255483 A1* | 10/2011 | Xu et al. | 370/329 |
| 2013/0036338 A1* | 2/2013 | Kotecha et al. | 714/748 |

FOREIGN PATENT DOCUMENTS

| | | |
|---|---|---|
| KR | 10-0921467 | 10/2009 |
| KR | 10-2010-0019336 | 2/2010 |

OTHER PUBLICATIONS

Motorola, Inc., "Long Term Evolution (LTE): A Technical Overview", 2007.*

Zyren, Jim, "Overview of the 3GPP Long Term Evolution Physical Layer", Jul. 2007.*

3$^{rd}$ Generation Partnership Project; Technical Specification Group Radio Access Network; "Evolved Universal Terrestrial Radio Access (E-UTRA); Physical layer procedures (Release 9)", 3GPP TS 36.213, v9.1.0, Mar. 2010.

* cited by examiner (a)

(b)

METHOD AND DEVICE FOR RECEIVING DOWNLINK SIGNALS

This Application is a 35 U.S.C. §371 National Stage Entry of International Application No. PCT/KR2011/003452, filed May 11, 2011 and claims the benefit of U.S. Provisional Application No. 61/333,539, filed May 11, 2010, all of which are incorporated by reference in their entirety herein.

TECHNICAL FIELD

The present invention relates to a wireless communication system, and more particularly to a method and apparatus for receiving downlink signals.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

Accordingly, the present invention is directed to a method and apparatus for receiving downlink signals that substantially obviates one or more problems due to limitations and disadvantages of the related art. An object of the present invention is to provide a method and apparatus for efficiently using downlink resources in a wireless communication system.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for receiving a downlink signal in a wireless communication system, the method including receiving first control information for downlink scheduling from a first slot of a resource block (RB) pair, wherein the first control information includes allocation information of a plurality of contiguous resource blocks; receiving, if an RB pair including the first control information is present in the plurality of contiguous resource blocks, data from a second slot of the RB pair; and attempting to detect, if the RB pair including the first control information is located outside of the plurality of contiguous resource blocks, second control information for uplink scheduling at the second slot of the RB pair.

In another aspect of the present invention, a communication device configured to receive downlink signals in a wireless communication system includes: a radio frequency (RF) unit; and a microprocessor. The microprocessor receives first control information for downlink scheduling from a first slot of a resource block (RB) pair, the first control information including allocation information of a plurality of contiguous resource blocks, receives data from a second slot of the RB pair when an RB pair including the first control information is present in the plurality of contiguous resource blocks; and attempts to detect second control information for uplink scheduling at the second slot of the RB pair when the RB pair including the first control information is located outside of the plurality of contiguous resource blocks.

The resource unit allocation information may include a resource indication value (RIV), wherein the RIV indicates a start resource block (RB) and the number of contiguously allocated RBs.

If a pair of resource blocks (RBs) (i.e., an RB pair) in which the first control information is located outside of the plurality of contiguous resource blocks (RBs), the second control information may be present in the second slot of the RB pair.

The method may further include, if the first control information is present in the first RB pair at which the plurality of contiguous resource blocks (RBs) starts, receiving data from the second slot of the RB pair.

The method may further include attempting to detect the second control information in the remaining space other than the plurality of contiguous resource blocks (RBs) from among a predetermined search space for the second control information within the second slot.

Advantageous Effects

Exemplary embodiments of the present invention have the following effects. In accordance with the embodiments of the present invention, downlink resources can be efficiently used in a wireless communication system.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies such as, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMaX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. LTE-Advanced (LTE-A) is an evolved version of 3GPP LTE.

Although the following embodiments of the present invention will hereinafter describe inventive technical characteristics on the basis of the 3GPP system, it should be noted that the following embodiments will be disclosed only for illustrative purposes and the scope and spirit of the present invention are not limited thereto.

Figure 1:
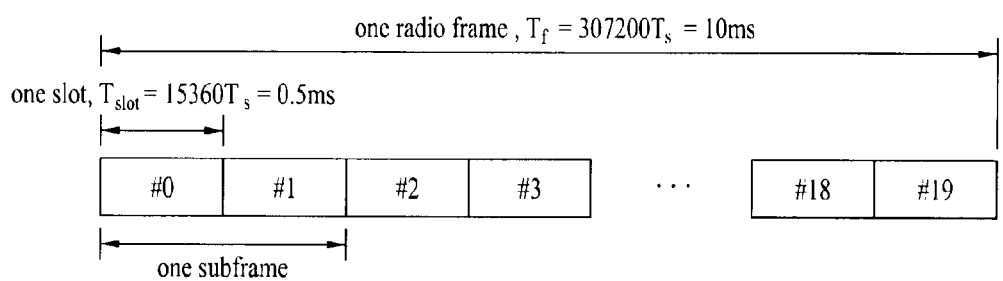
FIG. 1 exemplarily shows a radio frame structure for use in a 3rd Generation Partnership Project (3GPP) system.

FIG. 1 illustrates a radio frame structure for use in the 3GPP system.

Referring to FIG. 1, the radio frame has a length of 10 ms ($327200 \times T_s$) and includes 10 subframes of equal size. Each subframe has a length of 1 ms and includes two slots. Each slot has a length of 0.5 ms ($15360 \ast T_s$). In this case, $T_s$ represents sampling time, and is expressed by '$T_s=1/(15 \text{ kHz} \times 2048)=3.2552 \times 10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. The aforementioned structure of the radio frame is only exemplary, and various modifications can be made to the number of subframes contained in the radio frame or the number of slots contained in each subframe, or the number of OFDM symbols in each slot.

Figure 2:
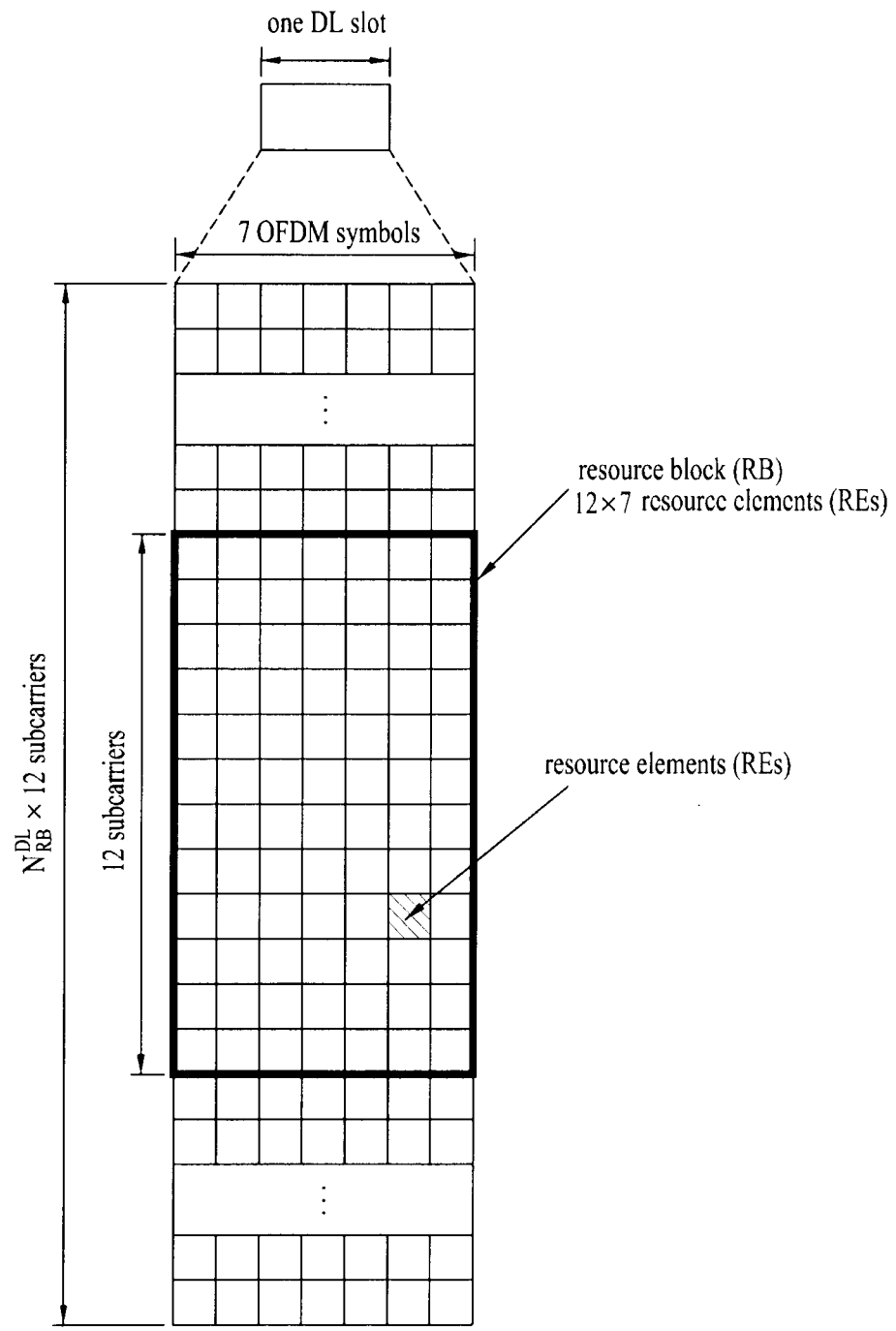
FIG. 2 exemplarily shows a resource grid of a downlink (DL) slot.

FIG. 2 illustrates a resource grid for a downlink slot.

Referring to FIG. 2, a downlink slot includes a plurality of OFDM symbols (for example, 7 OFDM symbols) in a time domain, and includes $N_{RB}^{DL}$ resource blocks in a frequency domain. Each resource block (RB) includes 12 subcarriers, such that a downlink slot includes ($N_{RB}^{DL} \times 12$) subcarriers. Although FIG. 2 illustrates that a downlink slot includes 7 OFDM symbols and a resource block (RB) includes 12 subcarriers, the scope or spirit of the present invention is not limited thereto and other examples can also be applied to the present invention. For example, the number of OFDM symbols contained in a downlink slot may be changed according to a Cyclic Prefix (CP) length. Each element on a resource grid may be defined as a resource element (RE). The RE represents minimum time/frequency resources defined in a physical channel, and is indicated by a single OFDM symbol index or a single subcarrier index. One RB may include ($N_{symb}^{DL} \times N_{sc}^{RB}$) resource elements (REs). $N_{symb}^{DL}$ is the number of OFDM symbols contained in a downlink slot, and $N_{sc}^{RB}$ is the number of subcarriers contained in a resource block (RB). The number ($N_{RB}^{DL}$) of RBs contained in a downlink slot is dependent upon a downlink transmission bandwidth established in a cell.

The downlink slot structure of FIG. 32 may be equally applied to an uplink slot structure. However, the uplink slot structure includes SC-FDMA symbols instead of OFDM symbols.

Figure 3:
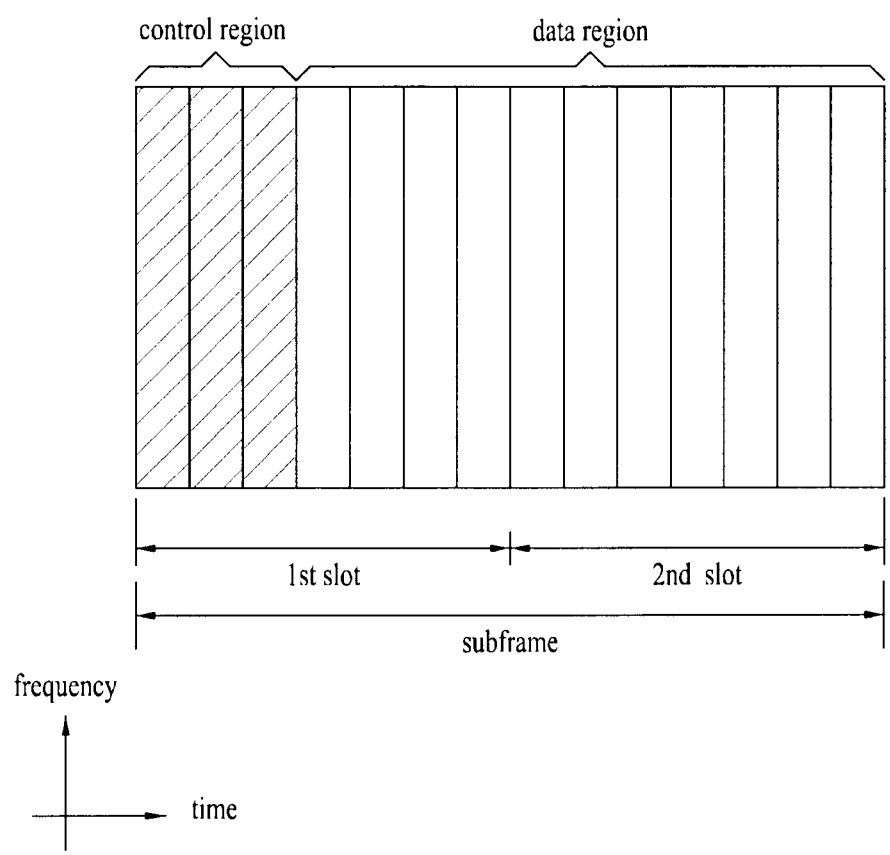
FIG. 3 exemplarily shows a downlink (DL) frame structure.

FIG. 3 exemplarily illustrates a downlink subframe structure for use in a 3GPP system.

Referring to FIG. 3, one or more OFDM symbols located in the front of the subframe are used as a control region, and the remaining OFDM symbols are used as a data region. The size of the control region may be independently established for each subframe. The control region may be adapted to transmit scheduling information and other L1/L2 control information. The control channel includes a Physical Control Format Indicator CHannel (PCFICH), a Physical Hybrid-automatic repeat request (ARQ) Indicator CHannel (PHICH), a Physical Downlink Control CHannel (PDCCH), and the like. The traffic channel includes a Physical Downlink Shared CHannel (PDSCH).

PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the eNB and the UE may transmit and receive data other than either specific control information or specific service data through the PDSCH. Control information transmitted through the PDCCH is referred to as downlink control information (DCI). The DCI transports uplink resource allocation information, downlink resource allocation information, or uplink transmission power control (TPC) commands for UE groups. The eNB determines a PDCCH format according to a DCI to be sent to the UE, and attaches a Cyclic Redundancy Check (CRC) to control information. A unique identifier (e.g., a Radio Network Temporary Identifier (RNTI)) is masked onto the CRC according to PDCCH owners or utilities.

Figure 4:
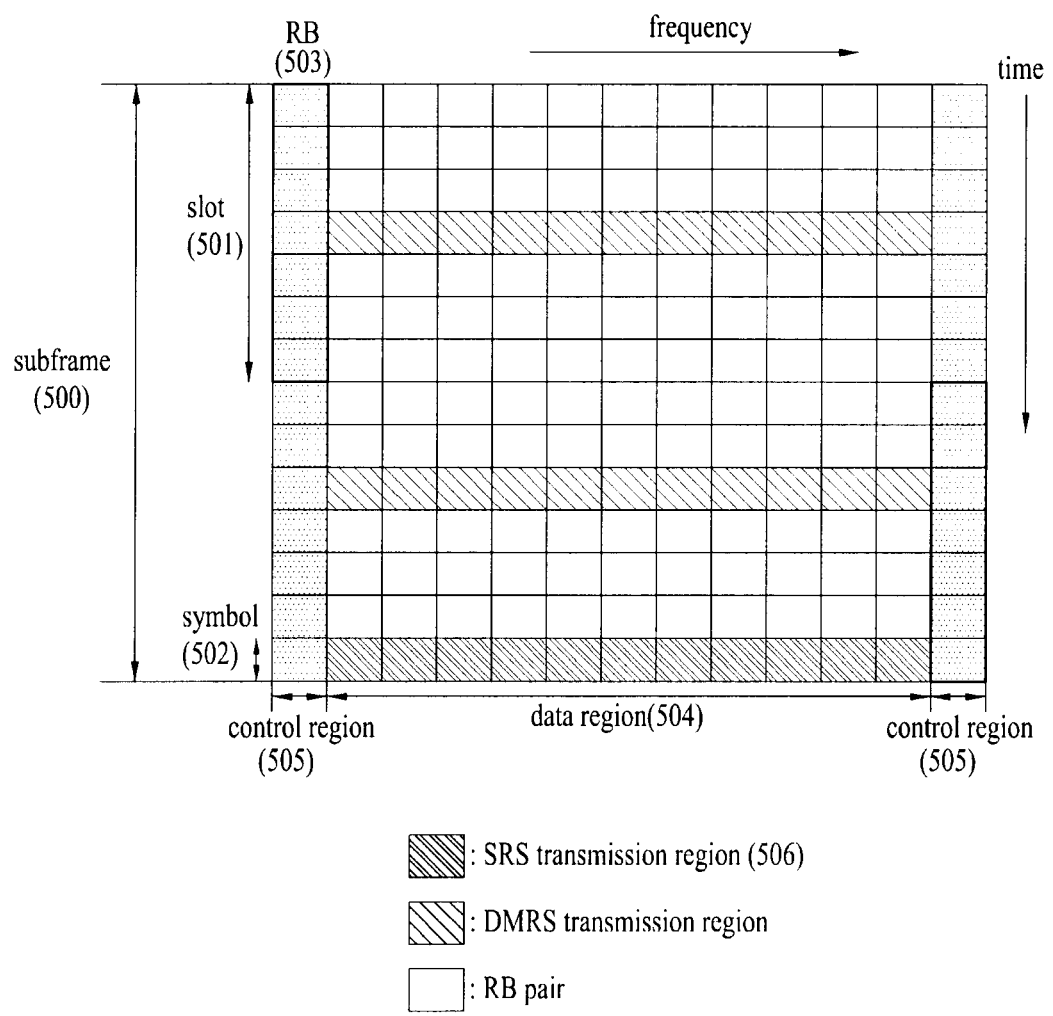
FIG. 4 exemplarily shows an uplink (UL) subframe structure for use in a system.

FIG. 4 exemplarily shows an uplink (UL) subframe structure for use in a system.

Referring to FIG. 4, a subframe 500 having a length of 1 ms, which is a basic unit of LTE uplink transmission, includes two 0.5 ms slots 501. Assuming the length of a normal Cyclic Prefix (CP), each slot includes 7 symbols 502 and one symbol corresponds to one SC-FDMA symbol. A resource block 503 is a resource allocation unit corresponding to 12 subcarriers in a frequency domain and one slot in a time domain. The structure of the LTE uplink subframe is broadly divided into a data region 504 and a control region 505. The data region refers to a series of communication resources used for transmission of data such as voice and packets transmitted to each UE and corresponds to resources except for a control region in a subframe. The control region refers to a series of communication resources used for transmission of downlink channel quality report from each UE, reception ACK/NACK for a downlink signal, uplink scheduling request, and the like. A region 506 in which Sounding Reference Signals (SRSs) can be transmitted is a duration in which an SC-FDMA symbol located at the last portion on a time axis in one subframe is present and is transmitted through a data transmission band on a frequency axis. SRSs of several UEs transmitted to the last SC-FDMA of the same subframe can be identified according to frequency positions/sequences.

Figure 5:
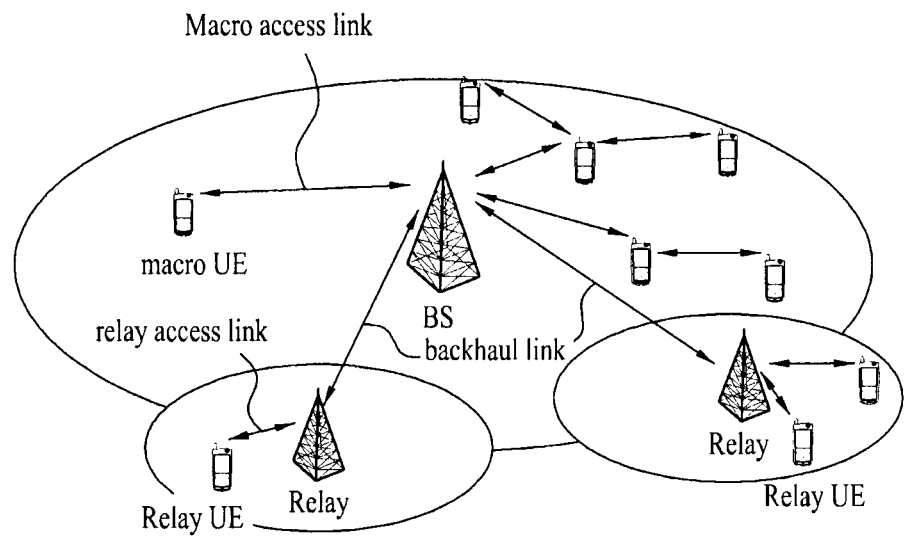
FIG. 5 exemplarily shows a wireless communication system including a relay.

FIG. 5 illustrates a wireless communication system having relays. A relay or Relay Node (RN) extends the service area of an eNB or is installed in a shadowing area to thereby provide a reliable service. Referring to FIG. 5, the wireless communication system includes an eNB, relays, and UEs. The UEs communicate with the eNB or the relays. For the sake of convenience, a UE communicating with an eNB is referred to as a macro UE and a UE communicating with a relay is referred to as a relay UE. A communication link between an eNB and a macro UE and a communication link between a relay and a relay UE are referred to as a macro access link and a relay access link, respectively. A communication link between an eNB and a relay is referred to as a backhaul link.

Relays are classified into L1 relays, L2 relays, and L3 relays according to their functionalities in multi-hop transmission. An L1 relay usually functions as a repeater. Thus, the L1 relay simply amplifies a signal received from an eNB or a UE and transmits the amplified signal to the UE or the BS. Because the L1 relay does not decode a received signal, the transmission delay of the signal is short. Despite this benefit, noise is also amplified because the L1 relay does not separate the signal from the noise. To avert this problem, an advanced repeater or smart repeater capable of UL power control or self-interference cancellation may be used. The operation of an L2 relay may be depicted as decode-and-forward. The L2 relay can transmit user-plane traffic to L2. While the L2 relay does not amplify noise, decoding increases transmission delay. An L3 relay whose operation is depicted as self-backhauling can transmit an Internet Protocol (IP) packet to L3. As it is equipped with a Radio Resource Control (RRC) function, the L3 layer serves as a small-size BS.

L1 and L2 relays may be regarded as part of a donor cell covered by a BS. In the case where a relay is part of a donor cell, the relay does not have its own cell ID because it cannot control its cell and UEs of the cell. Nonetheless, the relay may still have a relay ID. At least part of Radio Resource Management (RRM) is controlled by the eNB to which the donor cell belongs, while parts of the RRM may be located in the relay. An L3 relay can control cells of its own. As such, the L3 relay may manage one or more cells and each of the cells may have a unique physical-layer cell ID. The L3 relay may have the same RRM mechanism as a BS. From the perspective of a UE, there is no difference between accessing a cell controlled by the L3 relay and accessing a cell controlled by a normal BS.

Relays may be classified as follows according to mobility.
  Fixed RN: as is implied from its appellation, this type of RN is permanently fixed for use in a shadowing area or for coverage extension. It may function as a simple repeater.
  Nomadic RN: this type RN is temporarily installed when users are rapidly increasing in number, or is movable within a building.
  Mobile RN: this RN can be installed in a public transportation vehicle such as a bus or subway car. Mobility of the RN should be supported.

The following classifications can also be considered according to links between relays and networks.
  In-band connection: a network-to-relay link shares the same frequency band with a network-to-UE link in a donor cell.
  Out-band connection: a network-to-relay link and a network-to-UE link use different frequency bands in a donor cell.

With respect to knowledge of existence of a relay in a UE, relays are classified as follows.
  Transparent relay: a UE is not aware of whether or not it is communicating with a network via the relay.
  Non-transparent relay: a UE is aware of whether or not it is communicating with a network via the relay.

Figure 6:
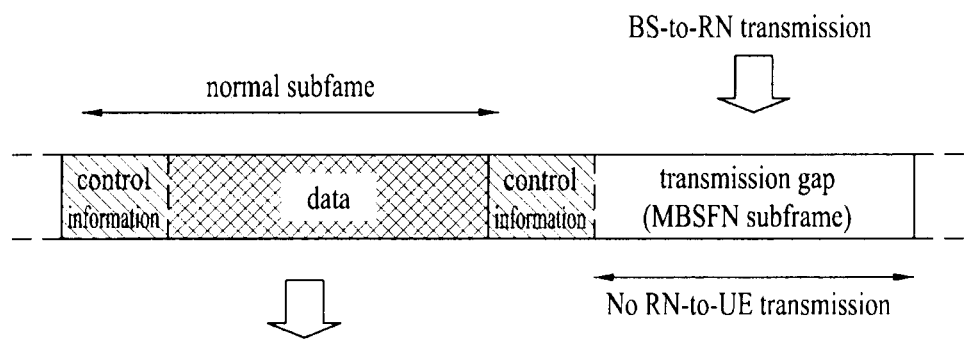
FIG. 6 is a diagram showing backhaul communication using a multimedia broadcast over a single frequency network (MBSFN) subframe.

FIG. 6 is a diagram showing backhaul communication using a multimedia broadcast over a single frequency network (MBSFN) subframe. In an in-band relay mode, a BS-relay link (that is, a backhaul link) and a relay-UE link (that is, a relay access link) operate in the same frequency band. If a relay transmits a signal to a UE while receiving a signal from a BS and vice versa, since a transmitter and a receiver of the relay cause interference, simultaneous transmission/reception of the relay may be prevented. In order to prevent simultaneous transmission/reception, a backhaul link and a relay access link are partitioned using a TDM scheme. In LTE-A, a backhaul link is set in an MBSFN subframe in order to support a measurement operation of a legacy LTE UE present in a relay zone (a fake MBSFN method). If an arbitrary subframe is signaled as an MBSFN subframe, since a UE receives only a control (ctrl) region of the subframe, a relay may configure a backhaul link using a data region of the subframe. For example, a relay PDCCH (R-PDCCH) is transmitted using a specific resource region from a third OFDM symbol to a last OFDM symbol of an MBSFN subframe.

Figure 7:
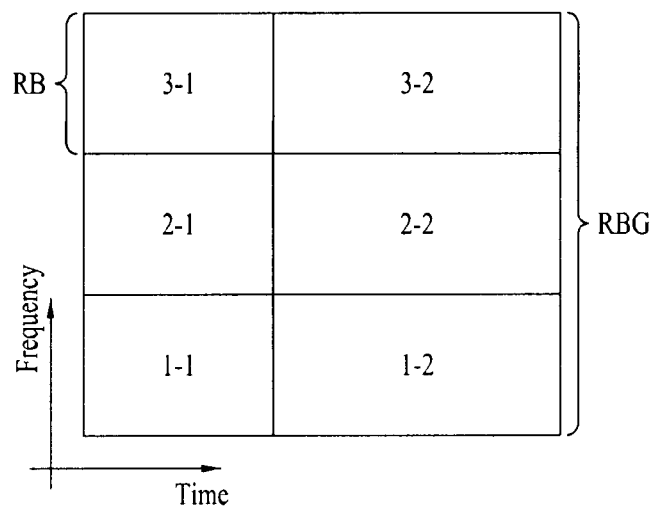
FIG. 7 is a diagram showing arbitrary division of frequency-time resources.

FIG. 7 is a diagram showing arbitrary division of frequency-time resources. FIG. 7 may also show a part of a downlink subframe.

In FIG. 7, the size of a frequency-time domain denoted by X-Y may be variously configured. In an LTE system, a resource region X-1 (X=1, 2, 3) may include 12 subcarriers in a frequency domain and four OFDM symbols in a time domain. A resource region X-2 (X=1, 2, 3) may include 12 subcarriers in a frequency domain and seven OFDM symbols in a time domain. The number of symbols may be changed according to the length of a cyclic prefix. The number of symbols and the number of subcarriers may have different values according to system. In other words, the resource region X-1 may be part of a first slot and the resource region X-2 may be part of a second slot. Such a resource configuration may typically appear in a backhaul subframe between a BS and a relay. In this case, FIG. 7 shows the remaining part of the MBSFN subframe of FIG. 6 except for the control information region.

FIG. 7 shows a resource block (RB) and a resource block group (RBG) in order to represent a resource size in a frequency domain. The RB is defined in slot units as shown in FIG. 2. Accordingly, X-Y corresponds to one RB and [X-1, X-2] corresponds to an RB pair. Unless specifically stated, the RB may be [X-1], [X-2] or [X-1, X-2] according to context. The RBG includes one or more contiguous RBs. Although the number of RBs configuring the RBG is 3 in FIG. 6, the number of RBs configuring the RBG may be changed according to a system bandwidth as shown in Table 3. The RB means a PRB or a VRB.

Hereinafter, how control information and data are allocated and transmitted in the resource configuration shown in FIG. 7 will be described. Unless specifically stated, a single antenna port will be focused upon and a resource region is represented by the method of FIG. 7, for convenience of description. It is apparent to those skilled in the art that the description of the single antenna port is applicable to multiple antenna ports.

Control information (e.g., R-PDCCH) used in a link between a BS and a relay is preferably transmitted in a predetermined specific resource region. In one example of the present invention, if Type 0 RA of LTE is used, a specific resource region (which is referred to as an R-PDCCH search space) in which control information may be transmitted may be restricted to K-th RBs of allocated RBG(s). Here, K denotes an integer less than the number of RBs configuring an RBG. In this case, the K-th RBs of all allocated RBGs may transmit an R-PDCCH. K may be a first RB or a last RB of an RGB group. Even in Type 1 or 2 RA, the concept of the RBG may be used and a specific RB of an RBG may be used as a resource region for R-PDCCH transmission in the tautological sense.

In addition, a method of separating RB(s) for the R-PDCCH search space from each other by the square of P within the RBG set if the R-PDCCH search space is set to one subset of an RBG set is proposed. Here, P is the number of RBs within an RBG. For example, assuming that the number of RBs is 32, 11 RBGs may be defined and one RBG may include three RBs (P=3). Accordingly, the RBs for the R-PDCCH search space may be placed at an interval of 3^2=9 RBs. The above-described example corresponds to the case in which one RBG subset is used and an interval of RBs within the subset is the square of P if the number of RBG subsets is 2. The interval between subsets may be changed depending on how many subsets are selected.

R-PDCCH/(R-)PDSCH Allocation and Demodulation

Control information is transmitted via an R-PDCCH and data is transmitted via an (R-)PDSCH. The R-PDCCH is roughly classified into two categories. One category is DL grant (DG) and the other category is UL grant (UG). The DL grant contains information about time/frequency/space resources of the R-PDSCH corresponding to data which should be received by a relay and information (scheduling information) for decoding. The UL grant contains information about time/frequency/space resources of the R-PUSCH corresponding to data which should be transmitted by a relay in uplink and information (scheduling information) for decoding. Hereinafter, a method of placing DL/UL grant in a resource region of a backhaul subframe and demodulating the DL/UL grant will be described.

DL grant and UL grant may be present in RBs of different slots. For example, DL grant may be present in an RB of a first slot and UL grant may be present in an RB of a second slot. In this case, a resource region for DL data and a region for UL grant coexist. Resources used to actually transmit DL data are indicated by RA of DL grant and resources used to actually transmit UL grant are checked blind decoding. Accordingly, if UL grant is detected in a resource region to which DL data is allocated, an RN receives/decodes DL data from resources other than resources in which UL grant is detected (that is, rate matching). For this reason, non-detection or misdetection of UL grant unpreferably influences on DL data decoding.

Figure 8:
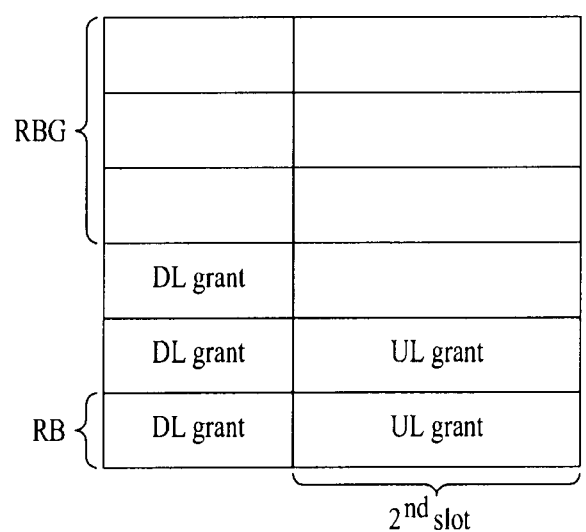
FIGS. 8 to 11 are diagrams showing examples of placing and demodulating an R-PDCCH/(R-)PDSCH.

An R-CCE aggregation level (e.g., 1, 2, 4, 8, . . . ) of an R-PDCCH may be changed according to channel environment. This is similar to a CCE set of an LTE PDCCH. The R-CCE is defined in order to represent a CCE for a relay, for convenience. In the following description, R-CCE and CCE are used interchangeably. It is assumed that DL grant of the R-PDCCH is present in three RBs as shown in FIG. 8 and UL grant is transmitted in a second slot of two RB pairs. In this case, when DL grant is blind-decoded to check R-CCE aggre-gation shown in FIG. 8, the relay may not be aware of whether UL grant or data is present in the second slot.

It is possible to indicate whether UL grant is present in the second slot using an RBG allocation bit. For example, if DL grant is present in a first slot, a resource allocation bit of the RBG may indicate whether an R-PDSCH or UL grant is present in a second slot. The following cases are possible.

(a) Presence of the R-PDSCH in the second slot, or (b) Presence of UL grant for a relay or UL grant for another relay in the second slot. UL grant of another RN may be CRC checked using an RN ID.

It is necessary to determine in which RB(s) UL grant is present. The number of RB pairs including UL grant may be changed according to R-CCE aggregation level.

The number/positions of RB pairs including UL grant may be checked by generating a simple relationship between a DL grant size and a UL grant size, which will be described with reference to FIGS. 9 and 10.

Figure 9:
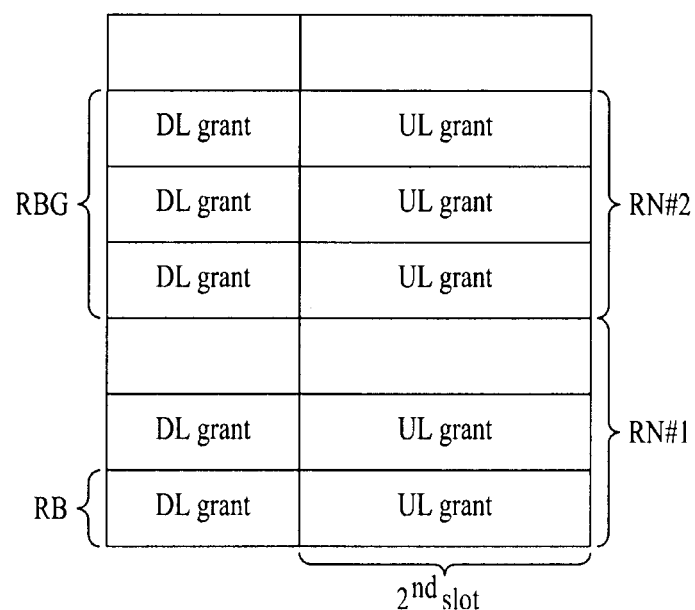

Referring to FIG. 9, UL grant may always be present in an RB pair including DL grant. Accordingly, if DL grant is present in two RB pairs, UL grant may be equally present in two RB pairs. Accordingly, if DL grant is successfully detected, the relay may check where UL grant is present. At this time, the aggregation level of UL grant may be set to be greater than the aggregation level of DL grant. Alternatively, it may be defined that a difference between the aggregation level of DL grant and the aggregation level of UL grant is N_level in advance.

In one embodiment, it may be defined that one R-CCE is present in a first slot of an RB pair and two R-CCEs are present in a second slot. In this case, the R-CCE of the first slot and the R-CCE of the second slot are different in size. According to the present example, it may be defined that the aggregation level of DL grant×2=the aggregation level of UL grant in advance. Referring to FIG. 9, the aggregation level of DL grant for RN#1 is 1 and the aggregation level of UL grant is 4. Similarly, the aggregation level of DL grant for RN#2 is 3 and the aggregation level of UL grant is 6.

As another example, it may be defined that an R-CCE size may be defined in slot units. That is, one R-CCE is present in a first slot of an RB pair and one R-CCE is present in a second slot. In this case, the R-CCE of the first slot and the R-CCE of the second slot are different in size. According to this example, it may be defined that the aggregation level of DL grant=the aggregation level of UL grant in advance. Referring to FIG. 9, in case of RN#1, the aggregation level of DL grant=the aggregation level of UL grant=2. Similarly, in case of RN#2, the aggregation level of DL grant=the aggregation level of UL grant=3.

Figure 10:
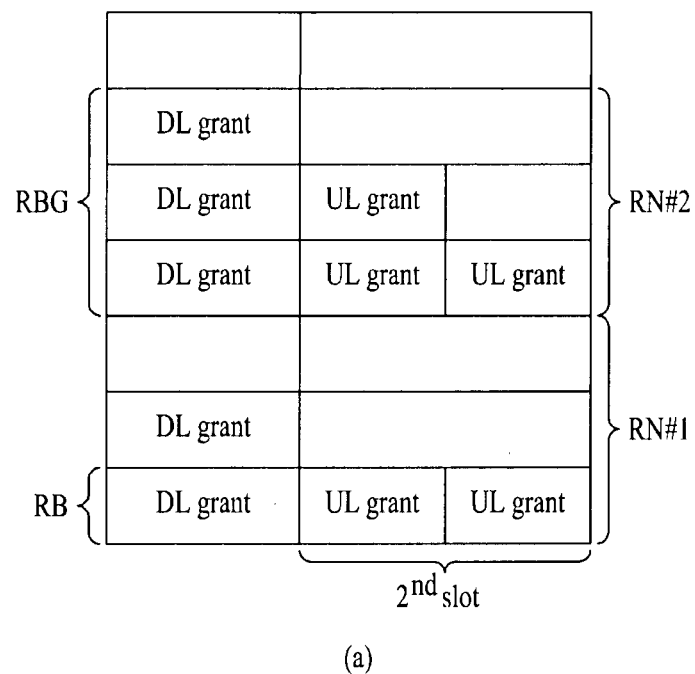
Figure 10:
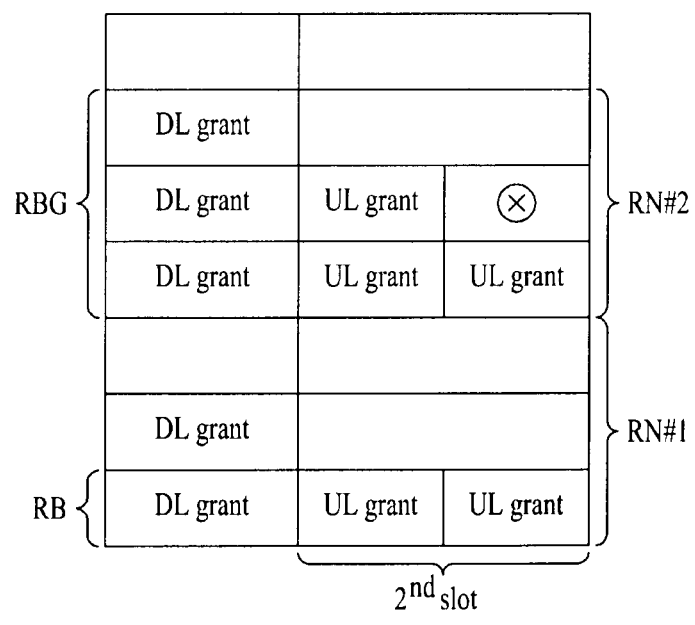

Referring to FIG. 10, an R-CCE size is set to 1 and the aggregation level of DL grant is equal to the aggregation level of UL grant. For example, the R-CCE size may be 32 REs. In this case, since the resource region of the second slot is larger, the placement shown in FIG. 10 is obtained. In case of RN#2, only some resources of the second slot of the second RB pair are used to transmit UL grant. In this case, an empty space of the second slot may be used to transmit data (FIG. 10(a)) or may not be used to transmit data (FIG. 10(b)).

As another method, the number of RBs occupied by UL grant may be restricted. For example, as in the case of RN#1 of FIG. 22, there is a restriction that UL grant may always be transmitted in the second slot of one RB pair. Such a restriction may be fixed in the standard and may be transmitted from a BS to an RN through a higher layer signal. If such a restriction is present, the RN may easily check the position of the region occupied by UL grant by reinterpreting the above-described RA information and thus check the position of a data signal.

In the above description, the RBG allocation bit may be reinterpreted and used to distinguish between UL grant and data (R-PDSCH) because of the assumption that the RBG is used only for the RN. However, if the RBG is used as original meaning thereof, a separate signal may be generated. Such a signal may be present in the R-PDCCH. A determination as to whether a separate signal is used or the RBG is reinterpreted and used may be set in advance or may be configured through semi-static signaling.

If decoding of UL grant fails in spite of indicating that UL grant is present in the above-described methods, data (including UL grant) present in the slot may be combined with data retransmitted via HARQ. In this case, since serious error may be generated in HARQ-combined data due to UL grant, previous data which may be included in UL grant may not be used in a HARQ combining process.

Figure 11:
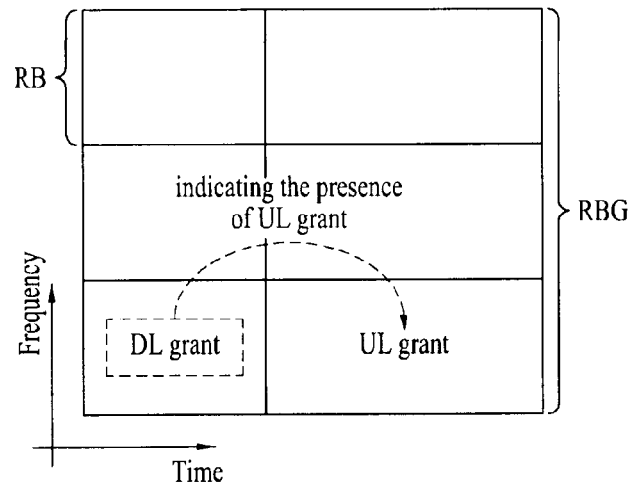

FIG. 11 shows a method of enabling DL grant to indicate presence of UL grant in a second slot by locating DL grant in a first slot even when only UL grant is present.

Referring to FIG. 11, even in the case in which there is no downlink data (e.g., (R-)PDSCH) to be transmitted from a BS to an RN (that is, UL grant only case), null DL grant (or dummy DL grant) may be transmitted in order to inform the RN that UL grant is present in the second slot of the same RB pair. According to the present example, regardless of presence/absence of downlink data for the RN, blind decoding for UL grant may be omitted and thus blind decoding complexity of the RN is reduced. In the case in which both DL grant and UL grant are transmitted but there is no downlink data for the RN as in this example, it should be indicated that there is no data corresponding to DL grant (that is, null DL grant). Therefore, null DL grant may indicate that all downlink transport blocks or codewords are disabled. In addition, null DL grant may indicate that a downlink transport block size (TBS) is TBS=0 or TBS<K (e.g., 4 RBs). In addition, null DL grant may indicate that there is no RB allocated for downlink transmission. In addition, a specific field within null DL grant may be set to "0" or "1". If null DL grant is detected, the relay interprets that data corresponding to null DL grant is not transmitted and checks presence of UL grant in the second slot from null DL grant.

Hereinafter, the problems encountered when a contiguous resource allocation scheme such as LTE RA Type 2 is applied to a relay backhaul link and methods for solving the problems will be described in detail.

Hereinafter, resource block mapping will be described. A physical resource block (PRB) and a virtual resource block (VRB) are defined. The PRB is equal to that shown in FIG. 2. That is, the PRB is defined as $N_{symb}^{DL}$ contiguous OFDM symbols in a time domain and $N_{sc}^{RB}$ contiguous subcarriers in a frequency domain. PRBs are numbered from 0 to $N_{RB}^{DL}-1$ in the frequency domain. A relationship between a PRB number $n_{PRB}$ and an RE (k, l) in a slot is shown in Equation 1.

$$n_{PRB} = \left\lfloor \frac{k}{N_{sc}^{RB}} \right\rfloor \quad \text{[Equation 1]}$$

In Equation 1, k denotes a subcarrier index and $N_{sc}^{RB}$, denotes the number of subcarriers included in one RB.

The VRB has the same size as the PRB. A localized VRB (LVRB) of a localized type and a distributed VRB (DVRB) of a distributed type are defined. Regardless of the type of the VRB, a pair of RBs is allocated over two slots by a single VRB number $n_{VRB}$.

Figure 12:
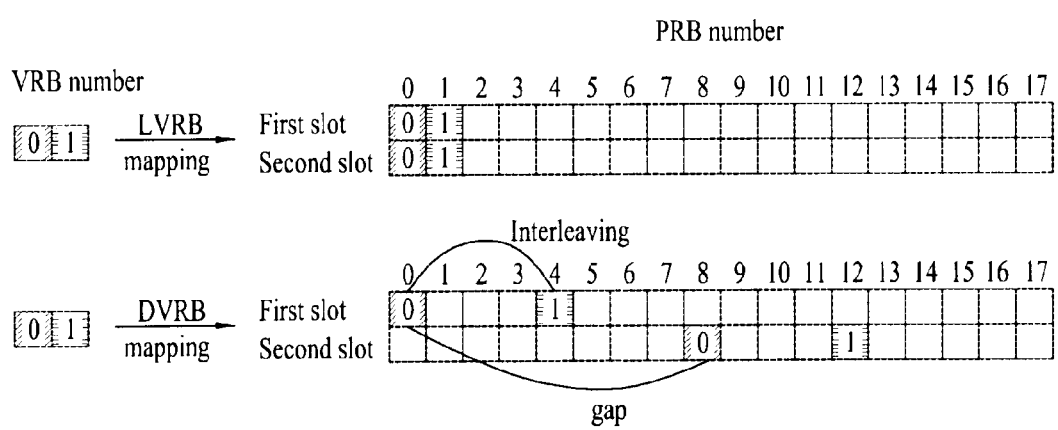
FIG. 12 exemplarily shows mapping between a virtual resource block (VRB) and a physical resource block (PRB).

FIG. 12 is a diagram showing a method of mapping a virtual resource block (VRB) to a physical resource block (PRB).

Referring to FIG. 12, since an LVRB is directly mapped to a PRB, a VRB number $n_{VRB}$ equally corresponds to a PRN number $n_{PRB}$ ($n_{PRB}=n_{VRB}$). The VRB is numbered from 0 to $N_{VRB}^{DL}-1$ and $N_{VRB}^{DL}=N_{RB}^{DL}$. The DVRB is mapped to the PRB after being interleaved. More specifically, the DVRB may be mapped to the PRB as shown in Table 1. Table 1 shows an RB gap value.

TABLE 1

| System BW ($N_{RB}^{DL}$) | Gap ($N_{gap}$) | |
|---|---|---|
| | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g., PRB unit) when VRBs having the same number are mapped to PRBs of a first slot and a second slot. In case of $6 \leq N_{RB}^{DL} \leq 49$, only one gap value is defined ($N_{gap}=N_{gap,1}$). In case of $50 \leq N_{RB}^{DL} \leq 110$, two gap values $N_{gap,1}$, $N_{gap,2}$ are defined. $N_{gap}=N_{gap,1}$ or $N_{gap}=N_{gap,2}$ is signaled through downlink scheduling. DVRBs are numbered from 0 to $N_{VRB}^{DL}-1$, is $N_{VRB}^{DL}=N_{VRB,gap,1}=2\cdot\min(N_{gap}, N_{RB}^{DL}-N_{gap})$ with respect to $N_{gap}=N_{gap,1}$, and is $N_{VRB}^{DL}=N_{VRB,gap2}^{DL}=\lfloor N_{RB}^{DL}/2N_{gap} \rfloor \cdot 2N_{gap}$ with respect to $N_{gap}=N_{gap,2}$. min(A,B) denotes the smaller of A or B.

Contiguous $\tilde{N}_{VRB}^{DL}$ VRB numbers configure a unit for VRB number interleaving, is $\tilde{N}_{VRB}^{DL}=N_{VRB}^{DL}$ in case of $N_{gap}=N_{gap,1}$ and is $\tilde{N}_{VRB}^{DL}=2N_{gap}$ in case of $N_{gap}=N_{gap,2}$. VRB number interleaving of each interleaving unit may be performed using four columns and $N_{row}$ rows. $N_{row}=\lceil \tilde{N}_{VRB}^{DL}/(4P) \rceil \cdot P$ and P denotes the size of a Resource Block Group (RBG). The RBG is defined by P contiguous RBs. The VRB number is written in a matrix on a row-by-row basis and is read on a column-by-column basis. $N_{null}$ null values are inserted into the last $N_{null}/2$ rows of second and fourth columns and $N_{null}=4N_{row}-\tilde{N}_{VRB}^{DL}$. The null value is ignored upon reading.

Figure 13:
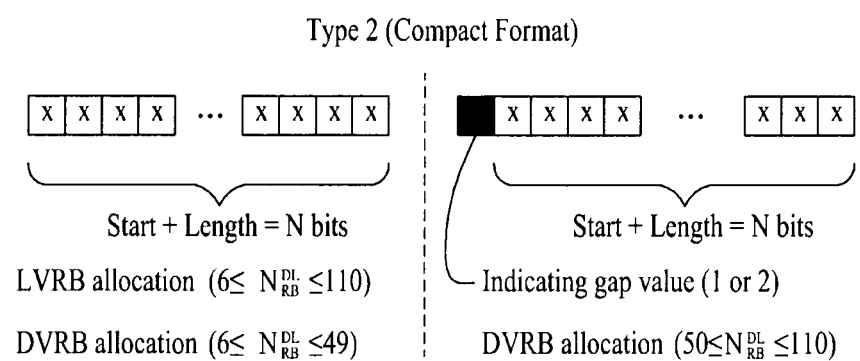
FIG. 13 exemplarily shows a Resource Allocation (RA) type 2.

FIG. 13 exemplarily shows a Resource Allocation (RA) type 2.

RA type 2 indicates the set of contiguously-allocated VRBs using a resource indication value (RIV) signal (i.e., compact type RA).

Referring to FIG. 13, in RA Type 2, resource block allocation information indicates an LVRB or DVRB set contiguously allocated to a scheduled UE. If resource allocation is signaled in PDCCH DCI format 1A, 1B or 1C, a 1-bit flag indicates whether an LVRB or DVRB is allocated (e.g., 0 denotes LVRB allocation and 1 denotes DVRB allocation). In contrast, if resource allocation is signaled in PDCCH DCI format 1C, only DVRB is always allocated. A Type 2 RA field includes a resource indication value (RIV) and the RIV corresponds to a start resource block $RB_{start}$ and a length. The length denotes the number ($L_{CRBs}$) of virtually and contiguously allocated resource blocks. The resource allocation field for RA Type 2 can be used for the following purposes.

Support of LVRB allocation for entire bandwidth (i.e., 6~110 RBs): When LVRB is configured by an 1-bit flag carried on PDCCH, the entire bits are used for indicating LVRB resource.

Support of DVRB allocation when a system BW is 6~49 RBs: When DVRB is configured by an 1-bit flag carried on PDCCH, the entire bits are used for indicating DVRB resource.

Support of DVRB allocation when a system BW is 50~110 RBs: When DVRB is configured by an 1-bit flag carried on PDCCH, the first bit is used for indicating gap value (1 or 2), while the remaining bits are used for indicating DVRB resource.

The above-mentioned LTE resource allocation scheme can be used to allocate backhaul resources to a relay node (RN). That is, when the BS allocates (R-)PDSCH resources to the RN, the legacy RA type 2 can be used. In this case, the legacy RA type 2 allocation information is transferred from the BS to the RN over R-PDCCH (DL grant).

Figure 14:
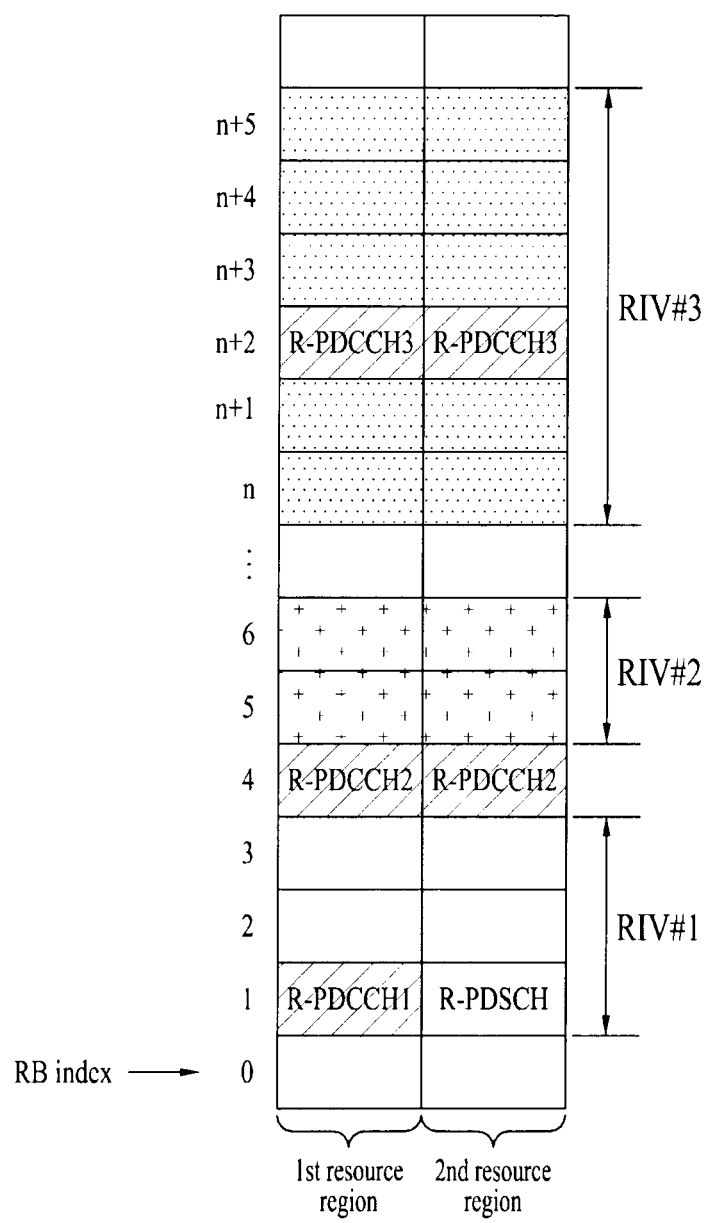
FIGS. 14 and 15 are diagrams showing various methods of indicating a use state of backhaul resources.
Figure 15:
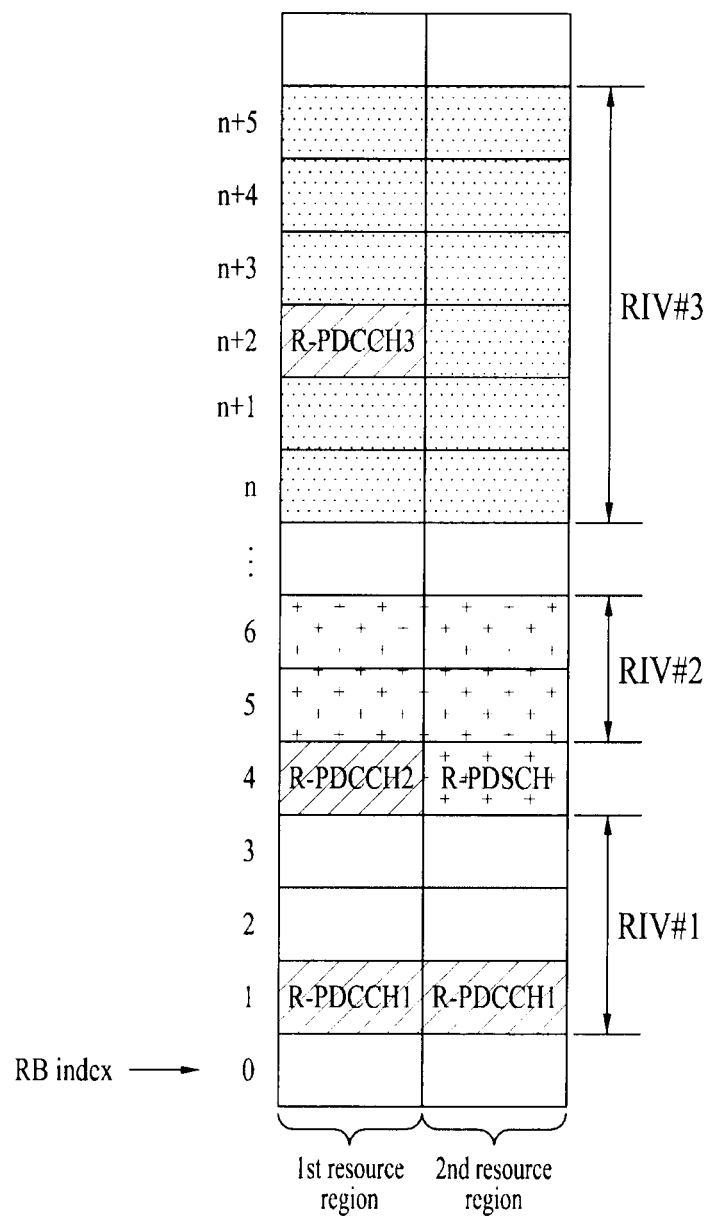

FIGS. 14 and 15 are diagrams showing various methods of indicating a use state of backhaul resources using an RIV according to the embodiment of the present invention. In FIGS. 14 and 15, it is assumed that R-PDCCHs 1~3 carry DCI for DL grant, and resource allocation information of the R-PDCCHs 1~3 indicates RIVs #1~#3. The following description assumes that a DL grant is transmitted at the first slot and a UL grant is transmitted at the second slot. However, the scope or spirit of the present invention is not limited thereto, and the DL grant can also be transmitted at the second slot and the UL grant can also be transmitted at the first slot. The resource structure for use in the FIGS. 14 and 15 is based on the frequency-time resource structure of FIG. 7. That is, the first resource region may correspond to the left resource region [X–1] of FIG. 7 and the second resource region may correspond to the right resource region [X–2] of FIG. 7. For convenience of description, it is assumed that the first resource region and the second resource region correspond to two slots of a subframe, respectively. However, the scope or spirit of the present invention is not limited thereto, and it should be noted that a boundary between the first resource region and the second resource region may be determined differently from the slot boundary.

Referring to FIG. 14, R-PDCCH1 is located at the first slot of RB#1, and RIV#1 indicates RBs from RB#1 to RB#3. In FIG. 14, it is assumed that R-PDCCH1 is located at the first slot of a first RB pair (i.e., the lowest RB index) from among resource blocks contiguously allocated by RIV. In this case, an RN corresponding to R-PDCCH1 can interpret/consider that data transmission (e.g., (R-)PDSCH) is present in a second slot of an RB pair including R-PDCCH1 whereas UL grant is not present in the second slot of the RB pair. In addition, the RN may interpret/consider that no UL grant is present in the contiguous resource blocks indicated by RIV#1. The operations based on the above-mentioned interpretation/consideration must be promised between a transmitter and a receiver.

In brief, assuming that resources contiguously allocated by RIV include an RB pair in which R-PDCCH (DL grant) is detected, and an RB pair in which R-PDCCH is detected corresponds to a first resource of the contiguously-allocated resource, the relay node (RN) can interpret/consider resource allocation information as follows.

(On the basis of the RB pair):
A different R-PDCCH is not present in a second slot of the detected RB pair. That is, (R-)PDSCH is present in the second slot of the RB pair in which R-PDCCH is detected.

(On the basis of the entire allocated resources):
A different R-PDCCH (e.g., UL grant) other than a DL grant of the corresponding RN is not present in resources allocated by RIV. That is, (R-)PDSCH is present in all the remaining resources other than a resource in which DL grant for the corresponding RN is detected. In other words, other R-PDCCHs are not present in the remaining parts other than a first slot of the RB pair in which R-PDCCH (DL grant) is detected in resources allocated by RIV.

In the second slot, R-PDCCH (e.g., UL grant) may be located outside of a resource region allocated by RIV. It should be noted that R-PDCCH is not always present in the second slot, and RIV is used to indicate a specific region including no R-PDCCH. In other words, a frequency resource (i.e., RB) through which an R-PDCCH candidate can be actually transmitted in the R-PDCCH search space is restricted by RIV.

In accordance with the above-mentioned interpretation/assumption, in the case of an RB pair through which R-PDCCH is detected in the first slot, it is assumed that R-PDCCH is present in the first slot and (R-)PDSCH is present in the second slot, such that the RN can perform decoding of (R-)PDSCH. That is, the first slot of the corresponding RB pair is not excluded from the (R-) PDSCH decoding. In the case of the RB pair in which no R-PDCCH is detected in the first slot, the (R-)PDSCH decoding can be carried out in a manner that (R-)PDSCH is present in both the first slot and the second slot. In addition, in order to allow the RN to receive the R-PDCCH at the second slot, the RN can attempt to perform blind decoding for R-PDCCH reception only in the remaining regions other than resources allocated by RIV from among the R-PDCCH search space separately established in the second slot. As a result, the RN can receive the R-PDCCH at the second slot.

In another example, R-PDCCH2 is located at the first slot of a resource block RB#4, and RIV#2 denotes RBs from RB#5 to RB#6. The above-mentioned example shows that R-PDCCH2 is located outside of resource blocks (RBs) contiguously allocated by RIV. Alternatively, the above-mentioned example shows that resource allocation starts from the next RB of the RB pair in which R-PDCCH2 exists and contiguous resource allocation is carried out by RIV. In this case, an RN corresponding to R-PDCCH2 may interpret/consider (resource allocation information) in such a manner that data transmission (e.g., (R-)PDSCH) is not present in a second slot of an RB pair including R-PDCCH2 whereas a UL grant (R-PDCCH2) is present in the second slot of the RB pair. In addition, the RN may interpret/consider (resource allocation information) in such a manner that no UL grant is present in contiguous resource blocks (RBs) indicated by RIV#2.

In brief, assuming that resources contiguously allocated by RIV include an RB pair in which R-PDCCH (DL grant) is detected (specifically, resources contiguously allocated by RIV start from the next RB of the RB pair in which R-PDCCH (DL grant) is detected), the relay node (RN) can interpret/consider resource allocation information as follows.

A different R-PDCCH (e.g., UL grant) may be present in a second slot of the RB pair in which R-PDCCH (DL grant) is detected. That is, R-PDCCH is not always present in the second slot of the RB pair, and frequency resources through which an R-PDCCH candidate can be actually transmitted in the R-PDCCH search space can be limited to the second slot of the RB pair in which a DL grant is detected. In another example, the UL grant may always be present in the second slot of the RB pair in which a DL grant is detected.

R-PDCCH is not present in resources allocated by RIV whereas (R-)PDSCH is present in the same resources. In other words, the resources allocated by RIV are used only for data transmission.

In accordance with the above-mentioned interpretation/assumption, in the case of an RB pair through which R-PDCCH is detected in the first slot, it is assumed that another R-PDCCH (e.g., UL grant) may (always) be present in the second slot. It is also assumed that (R-)PDSCH is present in resources indicated by RIV and the (R-)PDSCH can be decoded.

In another example, R-PDCCH3 may be located at the first slot of RB#n+2, and RIV#1 ranges from RB#n to RB#n+5. In accordance with the above-mentioned example, R-PDCCH3 may be located at the first slot of the remaining RB pairs (i.e., RB#n+1~RB#n+5) other than the first RB pair (i.e., the lowest RB index) from among resource blocks contiguously allocated by RIV. In addition, the above-mentioned example shows that R-PDCCH3 is located at the first slot of the RB pairs (i.e., RB#n+1~RB#n+4) contained in resource blocks contiguously allocated by RIV. In this case, an RN corresponding to R-PDCCH3 may interpret/consider (resource allocation information) in such a manner that data transmission (e.g., (R-)PDSCH) is not present in a second slot of an RB pair including R-PDCCH3 and a UL grant is present in the second slot of the RB pair. In another example, the relay node (RN) can also interpret/consider (resource allocation information) in such a manner that a UL grant is always present in the second slot of the RB pair including R-PDCCH3.

In brief, assuming that resources contiguously allocated by RIV include an RB pair in which R-PDCCH (DL grant) is detected, if an RB pair in which R-PDCCH is detected may not correspond to a first resource of the contiguously-allocated resource, or the RB pair in which R-PDCCH is detected is located in the contiguously allocated resources, the relay node (RN) can interpret/consider resource allocation information as follows.

(On the basis of the RB pair):

A different R-PDCCH (e.g., UL grant) may be present in a second slot of the detected RB pair. In this case, it should be noted that a UL grant is not always present in the second slot of the RB pair in which a DL grant is detected. A specific region in which the UL grant exists may be restricted to a second slot of an RB in which the DL grant was detected, or may also be restricted to the outside region of a specific region indicated by ('second slot on RB in which DL grant was detected'+RIV). In the latter case, RIV may be used to indicate the absence of a specific region in the second slot. In other words, a frequency resource (i.e., RB) through which an R-PDCCH candidate can be actually transmitted in the R-PDCCH search space of the second slot is limited to RIV. Meanwhile, in another example, another R-PDCCH (e.g., UL grant) may always be present in the second slot of the RB pair in which R-PDCCH (DL grant) was detected.

(On the basis of the entire allocated resources):

(R-)PDSCH is not present in the RB pair including R-PDCCH (DL grant) from among the entire resources allocated by RIV. That is, it is impossible for (R-)PDSCH to be contained in the second slot of the RB pair (where a DL grant for the corresponding relay was detected) from among the entire resources allocated by RIV.

In accordance with the above-mentioned interpretation/assumption, in the case of an RB pair through which R-PDCCH is detected in the first slot, it is assumed that another R-PDCCH (e.g., UL grant) may (always) be present in the second slot. Therefore, the RN may attempt to detect the UL grant in the second slot of the RB pair in which DL grant was detected. In another example, the relay node (RN) can attempt to detect the UL grant in the R-PDCCH search space of the second slot located outside of resources indicated by ('second slot on RB in which DL grant was detected'+RIV). In addition, it is assumed that (R-)PDSCH transmission is present in the remaining resources other than the RB pair in which DL grant was detected from among resources indicated by RIV. Therefore, the relay node (RN) may exclude first and second slots of the RB pair (where DL grant was detected) from the (R-) PDSCH decoding process.

Although the above-mentioned situations based on RIVs #1~#3 may occur in a communication process, it should be noted that only some situations may occur as necessary. For example, a resource use state of a backhaul subframe may be limited to a situation of RIV#1/#3 or a situation of RIV#2/#3. If the resource use state is limited as described above, the relay node (RN) can recognize a resource state in consideration of only one state indicating whether a resource region indicated by RIV includes or does not include an RB pair in which R-PDCCH was detected.

FIG. 15 exemplarily shows another scheme indicating a use state of backhaul resources using the RIV. Basic contents of FIG. 15 are identical to those of FIG. 14. Differently from FIG. 14, a resource use state of the second slot of the RB pair in which R-PDCCH (DL grant) was detected is opposed to the concept of FIG. 15. That is, assuming that R-PDCCH (e.g., UL grant) is present in the second slot of the RB pair in which DL grant was detected (See FIG. 14), (R-)PDSCH is present in the second slot of the corresponding RB pair (See FIG. 15). Similarly, assuming that (R-)PDSCH is present in the second slot of the RB pair in which DL grant was detected (See FIG. 14), R-PDCCH (e.g., UL grant) may be present in the second slot of the corresponding RB pair (See FIG. 15). In another example, assuming that (R-)PDSCH is present in the second slot of the RB pair in which DL grant was detected (See FIG. 14), R-PDCCH (e.g., UL grant) is always present in the second slot of the corresponding RB pair (See FIG. 15).

As described above, according to how the RB start position and length indicated by RIV is determined on the basis of R-PDCCH, a usage (for example, R-PDCCH (e.g., UL grant), (R-)PDSCH or Empty)) of the second resource region of the RB pair including R-PDCCH may be changed. That is, RIV may be used as implicit signaling information indicating a usage of the second resource region of the RB pair including R-PDCCH.

In addition, according to how to define the second resource region, it is determined whether information will be completely or partially filled in the second resource region.

The above-mentioned description may be used together with the high-aggregation-level R-PDCCH application methods shown in FIGS. 8 to 10.

The above description focuses upon a relationship between a BS and an RN, but is equally/similarly applied to a relationship between an RN and a UE. For example, if the above description is applied to a relationship between a BS and an RN, in the above description, an RN may be replaced with a UE. In addition, the above description is applied to a relationship between an RN and a BS, a BS may be replaced with an RN and an RN may be replaced with a UE.

Figure 16:
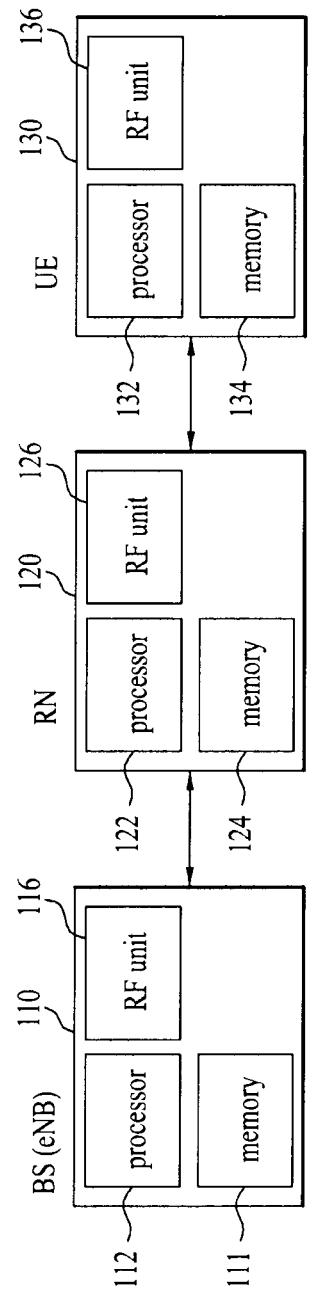
FIG. 16 is a block diagram illustrating a base station (BS), a relay and a user equipment (UE) applicable to embodiments of the present invention.

FIG. 16 is a block diagram illustrating a base station (BS), a relay and a user equipment (UE) applicable to embodiments of the present invention.

Referring to FIG. 16, the wireless communication system includes a base station (BS) 110 (also denoted by 'eNB'), a relay node (RN) 120 and a UE 130. Although FIG. 16 exemplarily shows a UE connected to the RN for convenience of description, it should be noted that the UE may be connected to the BS.

The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The RN 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The UE 130 includes a processor 132, a memory 134, and an RF unit 136. The processor 132 may be constructed to implement the procedures and/or methods disclosed in the embodiments of the present invention. The memory 134 may be connected to a processor 132, and store various information related to operations of the processor 132. The RF unit 136 is connected to the processor 132, and transmits and/or receives RF signals. The BS 110, the RN 120 and/or the UE 130 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB). In other words, it will be apparent that various operations performed for communication with the UE in the network which includes a plurality of network nodes along with the BS (or eNB) can be performed by the BS or network nodes other than the BS (or eNB). The term BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which come within the equivalent scope of the invention are within the scope of the invention.

INDUSTRIAL APPLICABILITY

Exemplary embodiments of the present invention can be applied to wireless communication systems such as a UE, a relay node (RN), and a BS (or eNB).

The invention claimed is:

1. A method for receiving a downlink signal in a wireless communication system, the method comprising:
   receiving first control information for downlink scheduling through a first slot of a resource block (RB) pair, wherein the first control information includes allocation information of a plurality of contiguous resource blocks;
   receiving data through a second slot of the RB pair, if the RB pair including the first control information is located in the plurality of contiguous resource blocks; and
   attempting to detect second control information for uplink scheduling in the second slot of the RB pair, if the RB pair including the first control information is located outside of the plurality of contiguous resource blocks.

2. The method according to claim 1, wherein the allocation information includes a resource indication value (RIV) indicating a start resource block (RB) of the plurality of contiguous resource blocks and a number of resource blocks contiguous to the start RB.

3. The method according to claim 1, wherein:
   if the RB pair including the first control information is located outside of the plurality of contiguous resource blocks, the second control information is located in the second slot of the RB pair.

4. The method according to claim 1, further comprising:
   attempting to detect the second control information in the remaining space other than the plurality of contiguous resource blocks (RBs) from among a predetermined search space for the second control information within the second slot.

5. A communication device configured to receive downlink signals in a wireless communication system comprising:
   a radio frequency (RF) unit; and
   a microprocessor,
   wherein the microprocessor receives first control information for downlink scheduling through a first slot of a resource block (RB) pair, the first control information including allocation information of a plurality of contiguous resource blocks, receives data through a second slot of the RB pair when the RB pair including the first control information is located in the plurality of contiguous resource blocks, and attempts to detect second control information for uplink scheduling in the second slot of the RB pair when the RB pair including the first control information is located outside of the plurality of contiguous resource blocks.

6. The communication device according to claim 5, wherein the allocation information includes a resource indication value (RIV) indicating a start resource block (RB) of the plurality of continuous resource blocks and a number of resource blocks contiguous to the start RB.

7. The communication device according to claim 5, wherein:
   if the RB pair including the first control information is located outside of the plurality of contiguous resource blocks, the second control information is located in the second slot of the RB pair.

8. The communication device according to claim 5, wherein the processor attempts to detect the second control information in the remaining space other than the plurality of contiguous resource blocks (RBs) from among a predetermined search space for the second control information within the second slot.

* * * * *